United States Patent [19]

Beckmann et al.

[11] 4,277,538
[45] Jul. 7, 1981

[54] METHOD OF MANUFACTURING LAMINATED SAFETY GLASS

[75] Inventors: Rolf Beckmann, Siegburg; Wilhelm Knackstedt, Hennef, both of Fed. Rep. of Germany

[73] Assignee: Dynamit Nobel Aktiengesellschaft, Troisdorf, Fed. Rep. of Germany

[21] Appl. No.: 114,801

[22] Filed: Jan. 24, 1980

Related U.S. Application Data

[63] Continuation of Ser. No. 738,402, Nov. 3, 1976, abandoned.

[30] Foreign Application Priority Data

Nov. 5, 1975 [DE] Fed. Rep. of Germany ....... 2549474

[51] Int. Cl.$^3$ ................... B32B 9/04; B32B 17/06; B32B 17/10
[52] U.S. Cl. .................... 428/429; 156/106; 428/442; 428/447
[58] Field of Search ............... 428/213, 214, 215, 216, 428/429, 442, 447; 156/99, 102, 106

[56] References Cited

U.S. PATENT DOCUMENTS

| | | | |
|---|---|---|---|
| 3,318,757 | 5/1967 | Atwell | 428/429 |
| 3,341,399 | 9/1967 | Hazdra et al. | 428/429 |
| 3,666,539 | 5/1972 | Kiel | 428/417 |
| 3,666,614 | 5/1972 | Snedeker et al. | 428/429 |
| 3,762,988 | 10/1973 | Clock et al. | 428/442 |
| 3,865,619 | 2/1975 | Pennewiss | 428/442 |
| 3,928,684 | 12/1975 | Büning et al. | 428/429 |
| 3,955,036 | 5/1976 | Plueddemann | 428/442 |
| 3,998,985 | 12/1976 | Kitaj | 428/442 |
| 4,020,217 | 4/1977 | Karasudani et al. | 428/429 |
| 4,027,072 | 5/1977 | Molari, Jr. | 428/429 |
| 4,144,376 | 3/1979 | Beckmann et al. | 428/429 |

*Primary Examiner*—William J. Van Balen
*Attorney, Agent, or Firm*—Sprung, Felfe, Horn, Lynch & Kramer

[57] ABSTRACT

A laminated safety glass comprising a layer of a silicate glass, to which is bonded a layer of a plasticized plastic sheet containing polyvinyl chloride, said laminate containing therein an organofunctional silane and a process for preparing such laminated safety glass by unilateral or bilateral bonding of one or more silicate glass sheets with a plasticized polyvinyl chloride plastic film at an elevated temperature wherein the bonding is effected with the aid of a silicon-organo-functional silane and the bonding is effected at 120°–200° C.

35 Claims, No Drawings

METHOD OF MANUFACTURING LAMINATED SAFETY GLASS

This is a continuation of application Ser. No. 738,402, filed Nov. 3, 1976, now abandoned.

BACKGROUND OF THE INVENTION

1. Field of the Invention

The subject of the invention is a method of manufacturing laminated safety glass by the bonding together of one or more sheets of silicate glass by means of plasticized plastic films at elevated temperatures, with the aid of silanes.

2. Discussion of the Prior Art

There are many applications for laminated safety glass. It is used, for example, in the building industry for the production of doors or windows, bullet-proof glass and skylights, and in the automotive industry especially for the manufacture of windshields.

The term, "laminated safety glass", as used herein, is to be understood to mean a sandwich consisting of one or more silicate glass sheets bonded together in one unit with a film of organic material. If the glass is broken, the fragments adhere to the film. Loose, sharp-edged splinters are not formed (cf. DIN 1259, Sheet 2).

Laminated safety glass must satisfy certain quality requirements according to the purpose for which it is to be used. In the case of motor vehicles, these quality requirements are laid down in the "Strassenverkehrszulassungsordnung" of the German Federal Republic, Section 22, No. 29, in "Motor Vehicle Safety Standards" Nos. 205 and 208, and in U.S.A. Standard Z 26.1-1966. Quality requirements for use in the building industry are established in "American National Standard Institute" Standard Z 97.1-1966, and for use as bullet-proof material they are specified in "Underwriters Laboratories" Standard 752.

In practice, the use of laminated safety glasses on the basis of silicate glass sheets bonded together with films of plasticized polyvinyl butyral has become widespread. However, the use of polyvinyl butyral films containing plasticizers makes the production of laminated safety glass very expensive.

Polyvinyl butyral films cannot generally be manufactured on the commonly available equipment such as is used for the production of other plastic films, and apparatus especially designed for this type of film must be used not only for the production of such films, but also for their incorporation into laminated safety glass. Certain special requirements must be satisfied. For example, the films have to be adjusted to certain specific moisture contents and to precise free hydroxyl group contents in order that the optimum adhesive strength desired for the particular application can be consistently achieved. An account of their sensitivity to moisture, polyvinyl butyral films must be handled under controlled atmospheric conditions in most cases, not only during their manufacture and storage, but also immediately prior to their incorporation into the laminated safety glass. It is also disadvantageous that polyvinyl butyral films containing plasticizer sticks to itself and therefore must first be provided with a parting means if they are to be stored or transported in the form of stacks of die-cut blanks or in the form of rolls.

It has been proposed to replace the plasticized polyvinyl butyral film with other organic adhesive materials. For example, it is proposed in German "Offenlegungsschrift" No. 1,421,142 that films of highly polymerized vinyl chloride be used as fire-retardant intermediate layers, to which vinyl chloride of a low degree of polymerization (K values under 50, preferably between 30 and 40) has been added for the achievement of adhesion to glass. The low polymers can also be applied to the surfaces of the glass sheets in the form of a thin, viscid coating before they are joined together. With adhesive films of this kind, approximately the same problems are encountered as in the preparation and use of polyvinyl butyral films.

OBJECTS OF THE INVENTION

It is an object of this invention to provide a laminated safety glass comprising a layer of silica glass and a layer of a film of a plastic sheet. It is especially an object of this invention to provide such a laminated safety glass which is free of the above-described difficulties, can be readily assembled and would satisfy the various requirements of the industry, in particular the requirements set forth in Deutsche Industrie Norm 1259 with respect to adhesion.

This problem can not be solved by any process similar to the prior-art method of manufacturing laminated safety glass on the basis of polyvinyl butyral films, because sufficient adhesion to the silicate glass cannot be achieved with plasticized polyvinyl chloride films. It is therefore an additional object of this invention to produce a laminated safety glass on the basis of silicate glass and plasticized polyvinyl chloride films having sufficient adhesion between the individual layers.

To judge the strength of the adhesion of the film to the silicate glass, the pummeling test used in the safety glass industry is performed. It is described, for example, in British Pat. No. 1,093,864. Accordingly, the test specimen, measuring approximately 150×300 mm, is refrigerated for about 2 to 8 hours at −18° C.±0.5° C., laid on a metal block tilted at an angle of about 45°, and hammered with a flat-faced hammer until the silicate glass is pulverized. The test surface size is about 100×150 mm. Adhesion is judged according to a scale from 0 to 10. These values are as follows:

| % exposed film surface | Pummel value |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

Visual judgment is facilitated by the fact that illustrations are also provided on the scale opposite the pummel values. It has been found that this "non-quantitative" pummel test is entirely adequate in practice, and that adhesion can be judged with sufficient accuracy on the basis of visual appraisal. In the examples that follow, the pummeling tests were performed not only at −18° C. but also at +23° C. and +90° C.

The conventional methods of manufacturing laminated safety glass on the basis of plasticized polyvinyl butyral and silicate glass are practiced at a maximum temperature of 125° to 150° C. for a period of 30 to 120 minutes, at pressures of 7 to 15 bars. These temperatures and pressures are not sufficient for the surface softening of plasticized polyvinyl chloride, so that no bond is obtained. If, under otherwise identical conditions, the temperature is increased to 175° C., a laminate is obtained, but one which does not obtain sufficiently good adhesion between the silicate glass and the plasticized polyvinyl chloride. This becomes immediately apparent when such laminates are cut into smaller pieces by scratching the silicate glass sheets with a diamond or steel storing wheel and then cracking them apart so that the film between them can then be severed with a razor blade. In the pummel testing of such laminates at the test temperatures of −20, +23 or +90 degrees C., the shattered glass drops away from the plasticized polyvinyl chloride film over large areas.

Further experiments using variations of the manufacturing conditions by changing the temperature and increasing the pressure produce basically the same negative results.

The physical methods tested thus did not yield any solution to the problem to which we addressed ourselves. Adhesion by means of special cements is possible, but expensive. Chemically hardening combinations which form no by-products can be used for this purpose, that is, two-component systems such as epoxy resins, unsaturated polyesters or polyurethanes. Hardening begins as soon as the two components are mixed. This means, however, that the application of the mixture to the confronting surfaces must be performed just before the sandwich is assembled, i.e., this must be done by the safety glass manufacturer. The latter, however, is demanding from the film manufacturer a product which he can use without pre-treatment. The problem on which the invention is based was not to be solved in this manner, namely the problem of supplying the safety glass manufacturer with a prepared film of good adhesive strength, which can be handled under the customary conditions.

SUMMARY OF THE INVENTION

As the solution to the above-stated problem, it has now been found that the disadvantages described can be avoided by using certain monomeric adhesion-producing substances which, preferably dissolved in solvents, are applied by immersion, spraying or other such simple methods to the confronting surfaces or, in some cases, by incorporating them into the composition which is to be made into a film. Certain silanes have proven to be suitable as such substances.

The invention, therefore, comprises a method of manufacturing laminated safety glass by the bonding of one or more silicate glass sheets on one or both sides to plasticized plastic films at elevated temperatures with the aid of silanes, which is characterized in that, as the plastic film, plasticized films of high-molecular-weight weight vinyl chloride homopolymers and/or copolymers and/or graft polymers containing polyvinyl chloride are used, and, as silanes, silicon-organofunctional silanes are used, mixed in some cases with one or more silicon-functional silanes, and the bond is produced at 120° to 200° C.

The polyvinyl chloride used in making the films has K values of preferably 50 to 80, and advantageously of 60 to 75.

It has for years been known and frequently stated in the literature that bifunctional silanes are used for the improvement of the strength of the adhesion of synthetic resins to inorganic substrates. The possibilities for such applications range from filled or reinforced plastics to sealing compositions, glues or lacquers. In all of the systems described, the object has been to improve an existing adhesive strength such that it will be retained, or will be decreased within reasonable limits, even after immerion in water or exposure to moisture.

It was the object of the invention, not to further improve an already existing adhesive strength, but simply to make it possible for plasticized polyvinyl chloride film to adhere at all to glass in the first place.

In German Offenlegungsschrift No. 2,410,153, the application of silanes in conjunction with polyvinyl butyral films to the manufacture of laminated safety glass is described, in which the purpose is, not to improve the already great adhesion to glass, but on the contrary to achieve a controlled reduction of it. Since the object was entirely different, this Offenlegungsschrift disclosed nothing towards the solution of the problem with which we were concerned.

One advantageous embodiment of the process of the invention consists in dissolving the adhesion-producing silanes in solvents and applying the solution to at least one of the confronting surfaces by immersion, spraying or other such simple methods. It is desirable to remove the solvents after such application, before the layers are bonded together.

Surprisingly, films treated in this manner adhere very well to glass at an autoclave temperature of 175° C.

The process of the invention has the advantage that commercially available plasticized films containing polyvinyl chloride can be used, and that they do not stick to themselves, i.e., they do not have to be provided with a parting means, whether they are to be transported in the form of stacks of cut blanks or in rolls, as do plasticized polyvinyl butyral films. Also, they are not very sensitive to moisture and do not have to be stored in air-conditioned rooms prior to use. They are inexpensive, and they make it possible to produce the laminates with the machinery of the laminating industry, it being possible in most cases to eliminate the preliminary heating of the assembled glass sandwich.

A preferred embodiment of the process of the invention consists in applying the silanes to at least one of the confronting faces of the individual layers by passing e.g. the plasticized polyvinyl chloride films directly from the supply roll through a solution, for example, in which the silane is dissolved in a prescribed concentration, and then evaporating the solvent. The films thus treated are not sticky, and can be handled the same as untreated films.

Furthermore, in the method of the invention, one can treat the silicate glass sheets, instead of the films, in the same or a similar manner, though with the disadvantage that after the evaporation of the solvent the silane is in the form of a moist film on the silicate surface. In this case the silane can be baked on, if desired, by a suitable heat treatment. It is advantageous, however, to use a silane dissolved in a solvent together with a lacquer binding agent. The silane-containing lacquer is applied thinly to the silicate glass sheet, and then, when the lacquer is dry, it forms an organophilic silicate glass surface. It is also possible to apply the silane-containing lacquer to the plasticized polyvinyl chloride. The application of the lacquer is just as simple as the application of the pure silanes diluted in solvents. It is performed continuously, for example in an immersion bath with squeegee rollers followed by drying in a continuous drying oven. In this case, too, the film manufacturer can supply the laminated glass manufacturer with an already prepared film.

The great advantage of this process is the possibility of manufacturing laminated safety glasses at autoclave temperatures as low as from 135° to 145° C.

Suitable lacquer binding agents include non-hardening polymethacrylic or polyacrylic acid esters, soluble nonreactive polyurethanes, postchlorinated polyvinyl chloride, copolymers of vinyl chloride-vinyl acetate-vinyl alcohol or of vinyl chloride-vinyl isobutyl ether. All of these binding agents are commercial products which are offered by various manufacturers as lacquer raw materials. This list is by no means comprehensive of all applicable bonding agents.

It is furthermore subject matter of this patent application to apply the silanes of the invention, together with a thin film of suitable lacquer binding agents to one of the interfaces, preferably to the surfaces of the plasticized polyvinyl chloride films.

In another embodiment of the process of the invention, films are used which contain the silanes uniformly dispersed within them. In this case the silanes are added to the molding compositions either as they are or dissolved in a solvent. In this embodiment of the invention, the post-treatment of ready-made films or of the silicate glass sheets with the silanes used in accordance with the invention is unnecessary. For the achievement of a uniform distribution of the silanes, the latter can also first be dissolved or finely dispersed in the plasticizer that is to be added to the PVC composition, and be added together with the plasticizer along, if desired, with other conventional additives such as stabilizers, light stabilizers, dyes, and the like, to the composition which is to be formed into the film. The incorporation can be effected by means of conventional apparatus, such as mixing kneaders and the like.

The silicon-organofunctional containing silanes used in accordance with the invention are alkylene alkoxysilanes containing amino and/or imino or epoxy groups, one or both of the hydrogen atoms of the amino group being replaced by an amino or hydroxyalkyl or polyamino moiety. They are referred to hereinafter as silicon-organofunctional silanes since they contain not only functional groups, such as, for example, alkoxy groups which are directly linked to the silicon atom (i.e., silicon-functional groups), but also the above-named organofunctional groups which are linked to silicon by one or more carbon atoms.

In a preferred embodiment of the invention, therefore, the adhesive strength improving silicon-organofunctional silanes are preferably those of the General Formula

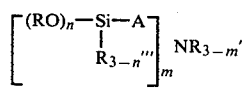   I in which
R is a $C_1$ to $C_{10}$ alkyl moiety interrupted, if desired, by oxygen atoms,
R''' is an alkyl moiety of 1 to 8 carbon atoms,
A is a straight-chained or branched alkylene moiety of 1 to 8 carbon atoms, interrupted, if desired, by oxygen bridges,
m = 1 or 2 or 3,
n = 1 or 2 or 3, R' when m = 1, represents H and/or R''—$NH_2$ or R''—OH (R'' representing an alkylene moiety of 2 to 4 carbon atoms), and
R' when m = 2, represents H or

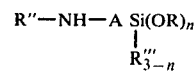

Furthermore, where R and R''' have the meaning given above in accordance with the invention, silicon-organo-functional silanes are used preferentially which have the general formula

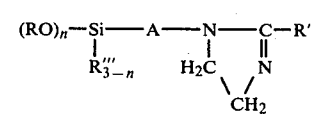   II

In Formula II, R, R''', A and n have the same meaning as in Formula I, R' represents H or $CH_3$ or $C_2H_5$.

Suitable aminosilanes are, for example, those of the formula $NH_2$—$(CH_2)_n$—Si—$(OR)_3$   III wherein n = 2 to 6 and R = $C_1$ to $C_8$ alkyl (branched or unbranched and, if desired, interrupted by 0 atoms, such as, for example, the —$CH_2$—$CH_2$—O—$CH_3$ moiety). Examples that can be given are the gamma-aminopropyl and gamma-aminoethyl trialkoxysilanes, in which the hydrogen atoms of the amino group are replaced, if desired, by an amino or polyamino alkyl moiety (e.g., the moiety —$CH_2(CH_2NHCH_2)_xCH_2$—$NH_2$ (x = 1 to 8)). The aminosilane that is preferred in accordance with the invention is gamma-aminopropyltriethoxysilane. Also suitable, however, are, for example, betaaminoethyl-gamma-oxypropylmethyldialkoxysilanes or polyaminotrialkoxysilanes, such as, for example:

[($CH_3O)_3Si$—$(CH_2)_2$]—NH—$CH_2(CH_2NH$ $CH_2)_x$—$CH_2NH_2$(x = 1-8).

Suitable iminosilanes are, for example, those of the formula

HN[$CH_2$—$CH_2$—$CH_2$—Si$(OR)_3]_2$   IV in which R has the same meaning as in Formula III. The iminosilane used preferentially is bis-triethoxysilylpropylimine.

Additional silanes used preferentially in accordance with the invention are the gamma-imidazolylpropyl-trialkoxysilanes. The alkoxy groups of the substances named above have the same meaning as those of Formula III.

Aminosilanes or iminosilanes or their mixtures are especially well suited for the purpose of the invention.

In the case of the silanes containing epoxy groups, the epoxy group

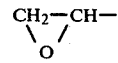

is linked to the alkylensilyl moiety by an ether (—$CH_2$—O—) or an ester grouping. However, it can also be linked to the alkylen moiety directly or through a cycloaliphatic ring, or it is a component of such a cycloaliphatic moiety. The preparation of such silanes is described in German Federal Pat. No. 1,061,321. The epoxy-group-containing silanes mentioned therein can also be used in accordance with the invention. Especially suitable silanes containing ether bridges are the glycidyl-oxypropyl-trimethoxy- or triethoxysilanes. Of the epoxy silanes containing ether bridges we can mention especially the compound

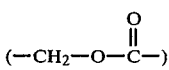

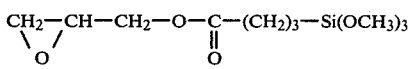

and of the epoxysilanes in which the epoxy group is a component of a cycloaliphatic ring we can mentioned especially beta-3,4-epoxycyclohexylethyltrimethoxysilane.

In the case of laminated safety glass in which a very good adhesion is desired between silicate glass and plasticized film containing polyvinyl chloride, only siliconorganofunctional silanes are used in accordance with the invention. Such laminated safety glasses can be used in the building industry, for example, as windowpanes, as bullet-proof glass, or in glass partitions.

On the other hand, the nature of the siliconorganofunctional silane or silane mixture and the amount thereof that must be used is of decisive importance if it is desired to obtain a laminated safety glass having controlled adhesion in a middle range of the pummel value scale. Laminated safety glasses of controlled adhesion can be used, for example, in the transportation industry as glazing materials for automobiles, rail cars, farm tractors, boats, aircraft etc.

The adhesive strength reducing silicon-functional silanes to be used in accordance with the invention are those of the general formula

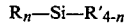

wherein R represents identical or different, saturated, straight or branched alkyl moieties of 1 to 10 carbon atoms, R' represents halogen, preferably Cl, or identical or different saturated alkoxy groups of 1 to 8 carbon atoms, interrupted, if desired, by hetero atoms such as —O—, and n is equal to 1 to 3. Preferably, n is equal to 1. The following are given as examples: propyltriethoxysilane, propyltrimethoxysilane, isopropyldimethoxyethoxysilane, n-butyl or isobutyl triethoxy or trimethoxy silane, and the like.

The adhesive strength of the films containing PVC in accordance with the invention can be adjusted to an optimum pummel value adapted to a particular application. For example, when preliminary testing shows that the molding composition to be made into a film will produce a bond which, on the basis of its high pummel value, is suitable for use in a laminated safety glass in the building industry but not in a windshield for use in motor vehicles, it can be converted to "windshield quality" by the addition of an adhesive-strength-reducing silicon-functional silane in an amount determined by preliminary testing.

On the other hand, a molding composition of "windshield quality" can be converted to one of "building industry quality" by the addition of a siliconorganofunctional silane in an amount determined by preliminary testing.

Suitable solvents for treating the films with silanes are those which wet the plasticized polyvinyl chloride films well without dissolving them, in which the silanes are easily soluble, and which evaporate sufficiently rapidly after the treatment. Toluene and xylene are well suited; also usable are benzine, ethyl acetate or butyl acetate, and others.

When ready-made plasticized films containing plasticizer are to be treated with silane solutions, the silane concentrations vary between about 0.01 and 5.0%, preferably 0.1 to 3% by weight, with respect to 100 weight-parts of solvent. If the appropriate silanes are to be added to the plasticized polyvinyl chloride composition before it is made into a sheet, the amounts of silane vary between about 0.1 and 5.0%, and preferably 0.5 to 3%, by weight, with respect to 100 weight-parts of the film composition.

The laminated glasses in which the plasticized films containing polyvinyl chloride, treated or modified in accordance with the invention, are used consist of at least one layer of such films. They can be made with unhardened, hardened, flat, curved, vapor coated, imprinted, colored, etched, or structured silicate sheet glass, provided with a wire insert if desired, as well as with colorless, colored transparent, color coated, or imprinted plasticized film containing polyvinyl chloride and treated or modified in accordance with the invention, containing, if desired, embedded wires, wire screen, fabrics or objects such as, for example, solar cells. The thicknesses of the silicate glasses and of the plasticized, polyvinyl-chloride-containing film treated or modified in accordance with the invention can be selected in accordance with the purpose involved, as can the number of layers in the sandwich. The laminated glass can thus be used in the building industry in doors and door assemblies, in windows and window assemblies, in panels in balconies, handrails or facades, in room dividers, balcony dividers or fencing, in roofs or roof parts for terraces, skylights or greenhouses, in telephone booths or computer enclosures, showcases, teller booths, prisons, or areas where there is risk of explosion or implosion, as safety glass for protection against break-through, break-ins, gunfire, noise, fire, cold, heat, incorporating, if desired, wires for alarm systems or for heating. In the transportation sector they can be used in the glazing of motor vehicles, rail cars, boats and aircraft, and in windshields, rear windows or side windows, doors, partitions, etc. If desired, the plasticized films containing polyvinyl chloride and treated or modified in accordance with the invention can be used for the preparation of laminates in combination with other transparent plastics. For example, laminates are conceivable in which, in addition to silicate glass and plasticized film containing polyvinyl chloride, use is made of polymethylmethacrylate, polycarbonate, polyethyleneterephthalate, hard PVC, polyamide etc., as elastic materials, and plasticized polyvinyl butyral, polyurethane, copolymers of ethylene, polyamides, polyepoxides, polysiloxanes, polymethacrylates and others are used as adhesive elastic materials.

The plasticized, polyvinyl-chloride-containing films treated or modified in accordance with the invention are made from polyvinyl chloride homopolymers having a K value of 50 to 80, preferably 60 to 75, and from copolymers with monomers from the hydrocarbon series, such as ethylene, propylene, isobutylene, methyl-2-butene-2, butadiene, styrene, or with monomers from the halogenated hydrocarbon series, such as vinyl fluoride, tetrafluorethylene, and other more highly fluorinated olefins, vinylidene chloride, trichlorethylene, 2-chloropropene-1 and other chlorinated higher olefins, halogenated butadienes, halogen styrenes, or with monomers from the alcohol and ether series, such as vinyl alcohol, vinyl methyl ether, vinyl ethyl ether, vinyl isobutyl ether and other other vinyl alkyl ethers, halogenated vinyl alkyl ethers, allyl glycide ethers, or with monomers from the series of the acids and acid derivatives, such as vinyl acetate, vinyl stearate, vinyl oleate, and other vinyl esters of higher fatty acids, vinyl esters of alkoxy acids, allyl esters, acrylic acid methyl or ethyl esters, acrylic esters of higher alcohols, acrylonitrile, methacrylic acid esters, olefin dicarboxylic acids and their esters, or with unsaturated compounds containing hetero atoms, such as nitrogen, phosphorus, sulfur and tin, as well as ternary copolymers of these components and graft polymers of vinyl chloride, reaction products of polyvinyl chloride or of the copolymers or graft polymers of vinyl chloride, such as, for example, post-chlorinated polyvinyl chloride, or mixtures of these above-named vinyl-chloride-containing polymers and mixtures with polyvinylidene chloride.

Especially suitable for the purpose of the invention are also films containing polyvinyl chloride which contain polymers which are miscible with polyvinyl chloride, preferably to not more than 50% by weight, which are not produced from vinyl chloride, such as, for example, polyvinyl acetate, copolymers of vinyl acetate and ethylene, ABS polymers, MBS polymers, and others.

The plasticizers for the preparation of the plasticized films containing polyvinyl chloride and treated or modified in accordance with the invention can be esters of phthalic acid, especially dioctyl phthalate, esters of aliphatic dicarboxylic acids, especially sebacic or adipic acid, esters of phosphoric acid, especially trioctylphosphate, and polymer plasticizers, especially those based on butadiene, acrylonitrile and styrene, and polyester plasticizers.

The Shore A hardness of the plasticized films containing polyvinyl chloride and treated or modified in accordance with the invention is measured according to DIN No. 53,505. It ranges between 40 and 98, preferably between 50 and 95.

EXAMPLES

The examples given below of the manufacture of the laminated safety glasses of the invention serve for explanation and do not constitute any limitation with regard to the subject matter of the invention.

EXAMPLE 1

A film 0.5 mm thick made:
(a) in one case from 75 parts of polyvinyl chloride of a K value of 65 and 25 parts of phthalate plasticizer,
(b) in another case from 63 parts of polyvinyl chloride of a K value of 75 and 37 parts of phthalate plasticizer, and
(c) in another case from 55 parts of polyvinyl chloride of a K value of 75 and 25 parts of phthalate plasticizer plus 20 parts of adipate plasticizer, was laid between two glass plates measuring 30×30 cm, and this cold assembly was passed through a two-roll calender equipped with rubber rolls, at a linear pressure of 5 kp per centimeter of the width of the pack to remove the air from between the layers. Then the pack was placed in a compressed-air autoclave and there treated at 12 bars and a maximum temperature of 175° C., being held at this maximum temperature for 25 minutes. The entire autoclaving process took 1½ hours. A completely clear, flawless laminated glass resulted, but one which in each case delaminated while it was being cut into smaller pieces, and which, in the pummeling tests at −20° C. and also at +23° C. and +90° C., had such poor adhesion that large pieces of glass came loose from the film.

EXAMPLE 2

A film 0.5 mm thick, made
(a) in one case from 75 parts of a copolymer of vinyl chloride with 10 wt.-% of vinyl acetate (K value 65) and 25 parts of phthalate plasticizer,
(b) in a second case from 80 parts of polyvinyl chloride of a K value of 60, 3 parts of a copolymer of ethylene with 45 wt.-% of vinyl acetate, and 17 parts of phthalate plasticizer,
(c) and in a third case from 80 parts of a graft polymer of a K value of 68 prepared from 10 parts of a copolymer of ethylene with 45 wt.-% of vinyl acetate and 90 parts of monomeric vinyl chloride, combined with 20 parts of phthalate plasticizer, was used in preparing a laminated glass sheet as described in Example 1. The adhesion between the layers was deficient in all three cases.

EXAMPLE 3

A film 0.5 mm thick was prepared in accordance with the formula of part (a) of Example 1, and one prepared as in part (b) thereof, were dipped briefly into a solution of 3 wt.-% of gamma-glycidyl-oxypropyl-trimethoxysilane (GLYMO) in benzine (boiling range 100°-140° C.) and then hung up to allow the solvent to evaporate. A strip was cut away from the top edge and one from the bottom, drip edge of the films and discarded, so that a film surface of uniform silane concentration was available for the tests. The same procedure was followed with another pair of the same kinds of films and a solution of 3 wt.-% of gamma-aminopropyl triethoxysilane (AMEO). As counter-specimens, films of the two formulas were dipped in benzine only in one case and left untreated in another. All 8 films were incorporated into laminated glass as in Example 1 and then pummeled at −20, +23 and +90 degrees C. The results are summarized in Table 1:

| | Pummeling Test Results | | | | | | | | | | | |
|---|---|---|---|---|---|---|---|---|---|---|---|---|
| | Untreated | | | Benzine | | | 3% GLYMO | | | 3% AMEO | | |
| | −20° | +23° | +90° | −20° | +23° | +90° | −20° | +23° | +90° | −20° | +23° | +90° |
| 75 parts PVC + 25 parts Plasticizer | 0 | 0 | 0 | 0 | 0 | 0 | 0 | 1 | 10 | 10 | 10 | 10 |
| 63 parts PVC + | 0 | 0 | 0 | 0 | 0 | 0 | 0 | 0 | 0 | 6 | 10 | 10 |

|  | Pummeling Test Results | | | | | | | | | | | |
|---|---|---|---|---|---|---|---|---|---|---|---|---|
|  | Untreated | | | Benzine | | | 3% GLYMO | | | 3% AMEO | | |
|  | −20° | +23° | +90° | −20° | +23° | +90° | −20° | +23° | +90° | −20° | +23° | +90° |
| 37 parts Plasticizer | | | | | | | | | | | | |

EXAMPLE 4

A film 0.5 mm thick made of 75 parts of polyvinyl chloride of a K value of 65 and 25 parts of phthalate plasticizer was treated in solutions of gamma-aminopropyltriethoxysilane (AMEO) and in benzine (boiling range 100°–140° C.) as well as in toluene as in Example 3. The concentration of the gamma-aminopropyltriethoxysilane was varied. The laminated glasses were prepared as described in Example 1. The pummeling test results showing the adhesion of the individual layers to one another are given in Table II.

TABLE II

| Wt.-% of AMEO in benzine | 1.0 | 0.5 | 0.1 | 0.05 | 0.01 | 0.001 |
|---|---|---|---|---|---|---|
| Pummel test value at −20° | 10 | 10 | 1 | 0 | 0 | 0 |
| +23° | 10 | 10 | 1 | 1 | 0 | 0 |
| +90° | 10 | 10 | 2 | 1 | 1 | 0 |
| Wt.-% of AMEO in toluene | 1.0 | 0.5 | 0.1 | 0.05 | 0.01 | 0.001 |
| Pummel test value at −20° | 10 | 10 | 1 | 0 | 0 | 0 |
| +23° | 10 | 10 | 1 | 0 | 0 | 0 |
| +90° | 10 | 10 | 4 | 1 | 1 | 1 |

EXAMPLE 5

A film 0.5 mm thick of the formula given in Example 4 was treated with solutions of 1 wt.-% of various silanes in benzine (boiling range 100°–140° C.), in toluene and in xylene, in the manner described in Example 3, and made into laminated glass as in Example 1.

The results are given in Table III.

TABLE III

| 1 wt.-% of silane | | Results of Pummeling Test | | | | | | | | |
|---|---|---|---|---|---|---|---|---|---|---|
|  |  | Sol. in benzine | | | Sol. in toluene | | | Sol. in xylene | | |
|  |  | −20° | +23° | +90° | −20° | +23° | +90° | −20° | +23° | +90° |
| Vinyltrimethoxysilane | VTMO* | 0 | 0 | 0 | 0 | 0 | 1 | — | — | — |
| Vinyltriethoxysilane | VTEO* | 0 | 0 | 0 | 0 | 0 | 0 | — | — | — |
| γ-Methacrylooxypropyltrimethoxysilane | MEMO* | 0 | 0 | 0 | 0 | 0 | 0 | — | — | — |
| Diethylphosphonic acid ethyltriethoxysilane | SIFO* | 0 | 0 | 0 | 0 | 0 | 1 | — | — | — |
| γ-Aminopropyltriethoxysilane | AMEO | 10 | 10 | 10 | 10 | 10 | 10 | 10 | 10 | 10 |
| γ-Imidazolylpropyltriethoxysilane | IMEO | 10 | 10 | 10 | 10 | 10 | 10 | 10 | 10 | 10 |
| γ-(β-Aminoethyl)-aminopropyltrimethoxysilane | DAMO | 10 | 10 | 10 | 10 | 10 | 10 | 10 | 10 | 10 |
| Bis-triethoxysilylpropylimine | IBEO | 0 | 0 | 4 | 2 | 2 | 4 | 0 | 0 | 0 |
| γ-Glycidyloxypropyltrimethoxysilane | GLYMO | — | — | — | 1 | 1 | 10 | — | — | — |
| γ-Mercaptopropyltrimethoxysilane | * | — | — | — | 0 | 0 | 0 | — | — | — |

*For purposes of comparison.

EXAMPLE 6

A film 0.5 mm thick of the formula given in Example 5 was treated in solutions of gamma-imidazolylpropyltriethoxysilane (IMEO) on toluene as in Example 3. The concentration of the gamma-imidazolylpropyltriethoxysilane was varied. The laminated glasses were produced as described in Example 1. The results of the pummeling test showing the adhesion of the individual layers to one another are given in Table IV.

TABLE IV

| Wt.-% IMEO | 1.0 | 0.5 | 0.1 | 0.05 | 0.01 | 0.001 |
|---|---|---|---|---|---|---|
| Pummeling test rating at −20° | 10 | 10 | 1 | 0 | 0 | 0 |
| +23° | 10 | 10 | 1 | 1 | 0 | 0 |
| +90° | 10 | 10 | 6 | 3 | 1 | 1 |

EXAMPLE 7

Six films 0.5 mm thick, of the formulas given in Examples 1 and 2 were treated with a solution of 1 wt.-% of gamma-imidazolylpropyltriethoxysilane (IMEO) in toluene as described in Example 3. All six films were used in making laminated glass as in Example 1, and then pummel-tested at −20, +23 and +90 degrees C. The results are summarized in Table V.

TABLE V

|  | Pummeling Test Rating | | |
|---|---|---|---|
|  | −20° | +23° | +90° |
| Homopolymer + 25 parts of phthalate plasticizer | 10 | 10 | 10 |
| Homopolymer + 37 parts of phthalate plasticizer | 10 | 10 | 10 |
| Homopolymer + 25 parts of phthalate plasticizer + 20 parts of adipate plasticizer | 10 | 10 | 10 |
| VC-VA copolymer + 25 parts of phthalate plasticizer | 10 | 10 | 10 |
| Mixture of PVC with vinyl acetate-ethylene copolymer + 17 parts of phthalate plasticizer | 10 | 10 | 10 |
| Graft polymer of VC onto vinyl | | | |

TABLE V-continued

|  | Pummeling Test Rating | | |
|---|---|---|---|
|  | −20° | +23° | +90° |
| acetate-ethylene copolymer + 20 parts of phthalate plasticizer | 6 | 10 | 10 |

EXAMPLE 8

A film 0.5 mm thick of the formula given in Example 1 (a) was treated with a mixture of silanes. Gamma-aminopropyltriethoxysilane (AMEO) was selected as the organosilicon-functional silane from among those mentioned in Examples 3 to 8. Isobutyltrimethoxysilane (ATAO) was used as an silicon-functional silane. The two silanes were divided in equal parts in benzine (boiling range 100°–140° C.), so that a concentration of 1 wt.-% was obtained with regard to each individual silane. The laminated glass was prepared as described in Example 1, and the quality of the adhesion, expressed in pummel test values, was:

| at −20° C. | 5 |
|---|---|
| +23° C. | 5 |
| +90° C. | 5. |

EXAMPLE 9

A film 0.5 mm thick of the formula given in Example 5 was treated with a solution of 1 wt.-% of gamma-aminopropyltriethoxysilane (AMEO) as described in Example 3, but was incorporated into a laminated glass sandwich in the autoclave at a pressure of 12 bars, the holding time at 175° C. being only 5 minutes. The total duration of the autoclaving process was 50 minutes and the adhesion of the layers to one another, expressed in pummel test values, was:

| at −20° C. | 10 |
|---|---|
| +23° C. | 10 |
| +90° C. | 10. |

EXAMPLE 10

The silicate glass sheets to be used in preparing the laminate were dipped into the solutions instead of the plasticized polyvinyl chloride films as in Example 3. The solvent was evaporated by letting the glasses stand in air overnight, so that a moist film of silane remained on the surfaces. The laminates were made as in Example 1. The resultant adhesion values were, as expected, lower, since the silane solutions were better able to drain off over the smooth, non-absorbent silicate glass surface.

TABLE VI

|  | Results of Pummeling Test | | | | | |
|---|---|---|---|---|---|---|
|  | 3% GLYMO | | | 3% AMEO | | |
|  | −20° | +23° | +90° | −20° | +23° | +90° |
| 75 parts PVC + 25 parts of Plasticizer | 0 | 0 | 4 | 0 | 2 | 10 |

EXAMPLE 11

10% solutions of a copolymer of vinyl chloride, vinyl acetate and vinyl alcohol and of a postchlorinated PVC were prepared. The plasticized polyvinyl chloride film described in Example 1a was treated in one case with the said lacquer solutions without the addition of silane, and in the other case with the lacquer solutions containing gamma-aminopropyltriethoxysilane (AMEO), gamma-imidazolylpropyltriethoxysilane (IMEO), and gamma-glycidyloxypropyltrimethoxysilane (GLYMO), respectively. The films thus treated were sandwiched in the manner described in Example 1 and made into laminated glass units by an autoclaving process at 135° C., at a pressure of 12 bars, over a period of 1½ hours. Table VII gives the adhesive strength ratings in terms of pummeling values.

TABLE VII

| Lacquer binding agent | Silane (wt.-%) | Pummeling Value | | |
|---|---|---|---|---|
|  |  | −20° C. | +23° C. | +90° C. |
| VC/VAC/VOH | — | 0 | 1 | 4 |
| " | AMEO 1% | 10 | 10 | 10 |
| " | IMEO 1% | 10 | 10 | 10 |
| " | GLYMO 1% | 0 | 5 | 6 |
| " | GLYMO 2% | 10 | 10 | 10 |
| Postchlorinated PVC | — | 0 | 1 | 6 |
| Postchlorinated PVC | AMEO 1% | 10 | 10 | 10 |
| Postchlorinated PVC | IMEO 1% | 10 | 10 | 10 |
| Postchlorinated PVC | GLYMO 1% | 0 | 4 | 7 |

EXAMPLE 12

As in Examples 10 and 11, the silicate glass sheets to be made into laminated glass were sprayed with solutions of 10 wt.-% of a copolymer of vinyl chloride, vinyl acetate and vinyl alcohol and 1 wt.-% of gamma-imidazolylpropyltriethoxysilane (IMEO), and 1 wt.-% of gamma-aminopropyltriethoxysilane (AMEO), respectively. The solvent was cautiously removed by evaporation. The treated silicate glasses were sandwiched in the manner described in Example 1 and pressed to form laminated glass units by an autoclaving process at 135° C., at a pressure of 12 bars, for a period of 1½ hours. The adhesive strength expressed as pummeling values was as follows:

|  | Pummeling Value | | |
|---|---|---|---|
|  | −20° | +23° | +90° |
| IMEO | 10 | 10 | 10 |
| AMEO | 10 | 10 | 10 |

EXAMPLE 13

A film 0.5 mm thick of the formula given in Example 5 was treated as described in Example 3 with a solution of 3 wt.-% of gamma-aminopropyltriethoxysilane (AMEO) in one case and with gamma-glycidylpropyltrimethoxysilane (GLYMO) in the other, and incorporated into laminated glass. The adhesion had been evaluated at pummel 10 and 1, respectively, at 23° C., in Example 3. These laminated glasses were subjected to testing for resistance to thermal shock and moisture in accordance with the following outline, in comparison to a specimen made with untreated film.

(a) 10 Days of exposure at 60°, 80° and 100° C.,
(b) followed by cooling in air and 15 hours of exposure to a temperature of −20° C., (c) then heating to room temperature and to temperature alternation testing from +60° to +10° C. by immersion in water, and (d) then to 4 hours of testing by boiling in accordance with DIN No. 53,308.

After these tests the adhesion values were determined by pummel testing at 23° C. to be as follows:

|  | Untreated | Dipped in 3% GLYMO | 3% AMEO |
|---|---|---|---|
| Before treatment | 0 | 1 | 10 |
| After treatment: |  |  |  |
| 60° specimen | 0 | 2 | 10 |
| 80° specimen | 0 | 2 | 10 |
| 100° specimen | 0 | 3 | 10 |

EXAMPLE 14

Various amounts of the following silanes were incorporated into a mixture of 75 parts of polyvinyl chloride of a K value of 65, and 25 parts of phthalate plasticizer:

(a) Gamma-aminopropyltriethoxysilane AMEO
(b) Gamma-imidazolylpropyltriethoxysilane IMEO
(c) Bis-triethoxysilylpropylimine IBEO
(d) Vinyltrimethoxysilane VTMO
(e) Vinyltriethoxysilane VTEO
(f) Gamma-methacryloxypropyltrimethoxysilane MEMO
(g) Diethylphosphonic acid ethyl triethoxysilane SIFO
(h) Isobutyltrimethoxysilane ATAO
(i) Gamma-mercaptopropyltrimethoxysilane MTMO.

Films were pressed from these mixtures, and were incorporated into laminated glass as described in Example 1. The adhesion expressed in pummel values is listed in Table VIII.

TABLE VIII

|  |  | Results of Pummel Test |  |  |
|---|---|---|---|---|
|  |  | −20° | +23° | +90° |
| (a) AMEO | 1.0 weight percent | 6 | 10 | 10 |
|  | 0.5 weight percent | 3 | 3 | 10 |
|  | 0.1 weight percent | 0 | 0 | 4 |
| (b) IMEO | 1.0 weight percent | 1 | 1 | 4 |
|  | 0.5 weight percent | 0 | 0 | 2 |
|  | 0.1 weight percent | 0 | 0 | 1 |
| (c) IBEO | 1.0 weight percent | 0 | 0 | 2 |
| (d) VTMO* | 1.0 weight percent | 0 | 0 | 0 |
| (e) VTEO* | 1.0 weight percent | 0 | 0 | 0 |
| (f) MEMO* | 1.0 weight percent | 0 | 0 | 0 |
| (g) SIFO* | 1.0 weight percent | 0 | 0 | 0 |
| (h) ATAO* | 1.0 weight percent | 0 | 0 | 0 |
| (i) MTMO* | 1.0 weight percent | 0 | 0 | 0 |

*for comparison

EXAMPLE 15

Films 0.4 mm thick prepared from 75 parts of polyvinyl chloride of a K value of 65, and 25 parts of phthalate plasticizer were treated with a solution of 0.5 wt.-% of gamma-aminopropyltriethoxysilane (AMEO) in toluene, as described in Example 3, and were incorporated into laminated glass as described in Example 1. Furthermore, films 0.4 mm thick prepared from plasticized polyvinyl butyral of good adhesion (structural glass quality) were conditioned to a moisture content of 0.4% by weight. The polyvinyl butyral films were laid between glass and heated in an oven to 85° C. (measured at the surface of the glass), and then passed between a pair of rubberized rollers as described in Example 1.

The autoclaving process was performed as described in Example 1, but at a maximum temperature of 140° C.

Both types of laminated glass were then subjected to a falling ball test similar to DIN No. 52,306, at a temperature of +23° C., using a steel ball weighing 227 g. This test yielded the following results:

TABLE IX

|  | 0.4 mm PVB Film | | | 0.4 mm PVC Film | | |
|---|---|---|---|---|---|---|
| Drop Height (m) | Crack length (cm) | Penetration | Wt. of splinters (g) | Crack length (cm) | Penetration | Wt. of splinters (g) |
| 2.00 | — | — | — | none | none | 0 |
| 3.00 | — | — | — | none | none | 0.1 |
| 4.00 | — | — | — | none | none | 0.5 |
| 6.00 | — | — | — | none | none | 1.3 |
| 8.00 | none | none | 1.3 | none | none | 1.0 |
| 12.00 | 15/17/12/14 | none | 6.8 | 17.2 | none | 6.0 |
| 13.00 | 9/2 | none | 6.2 | 12/15/4 | none | 7.2 |
| 14.00 | 11 | yes | — | 2 | none | 6.0 |
| 16.00 | 12/6/2/1 | none | 7.5 | 3 | none | 10.6 |
| 17.00 | 17/6/8/10/8 | embedded* | 13.7 | 5 | none | 9.3 |

*Ball did not pass all the way through.

What is claimed is:

1. In a method for manufacturing a laminated safety glass wherein a pair of silicate glass sheets are bonded to opposed sides of a plasticized plastic film at an elevated temperature, the improvement wherein said plasticized plastic film is a plasticized polyvinyl chloride containing film of a high molecular weight vinyl chloride homopolymer, copolymer or graft polymer and said plasticized film is bonded to said pair of silicate glass sheets with a bonding agent consisting essentially of a functional silane, the bonding being performed at a temperature in the range of 120° to 200° C.

2. A process according to claim 1 wherein the plasticized plastic film is a polyvinylchloride-containing film containing polymers miscible therewith which polymers are not made from vinyl chloride.

3. A process according to claim 1 wherein the polyvinyl chloride polymer of the plasticized plastic film has a K value of 50 to 80.

4. A process according to claim 3 wherein the polyvinyl chloride polymer of the plasticized plastic film has a K value of 60 to 75.

5. A process according to claim 1 wherein the plasticized plastic film has a Shore hardness A of 40 to 98.

6. A process according to claim 5 wherein the plasticized plastic film has a Shore hardness A of 50 to 95.

7. A process according to claim 1 wherein the functional silane is a silicon-organofunctional alkoxy silane containing an amino and/or imino or epoxy group, one or both of the hydrogen atoms of the amino group, if present, being replaceable by an amino, hydroxy alkyl or polyamino moiety.

8. A process according to claim 7 wherein the silicon-organofunctional silane has the general formula

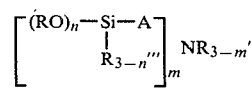

in which R is a $C_1$ to $C_{10}$ alkyl moiety which can be interrupted by oxygen atoms, R''' is an alkyl moiety of 1 to 8 carbon atoms, A is a straight-chain or branched alkylene moiety of 1 to 8 carbon atoms which can be interrupted by oxygen bridges, m=1 or 2 or 3, n=1 or 2 or 3, R', when m=1, represents H and/or R''—NH$_2$ or R''OH (R'' being an alkylene moiety of 2 to 4 carbon atoms), and, when m=2, R' represents H or $$R''-NH-A\underset{R'''_{3-n}}{\overset{|}{Si(OR)_n}}$$

9. A process according to claim 7 wherein the silicon-organofunctional silane is one having the formula $$(RO)_n-\underset{R'''_{3-n}}{\overset{|}{Si}}-A-\underset{H_2C}{\overset{|}{N}}-\underset{\underset{CH_2}{\diagup}}{\overset{\diagdown}{\overset{\|}{C}}}-R' \qquad II$$

in which R, R''', A and n have the same meaning as in Formula I and R' is H or CH$_3$ or C$_2$H$_5$.

10. A process according to claim 1 wherein said silane is dissolved in a solvent and is applied to at least one of the adjoining surfaces of the layers to be bonded and, prior to bonding, the surface is freed of said solvent.

11. A process according to claim 10 wherein the silane concentration in the solution ranges from 0.01 to 5 percent by weight.

12. A process according to claim 11 wherein the concentration of silane in the solution is from 0.1 to 3 percent by weight.

13. A process according to claim 1 wherein said silane is employed in the form of a solution containing a lacquer binding agent and is applied to at least one of the adjoining surfaces to be bonded and prior to bonding the surface is freed of said solvent, the bonding being carried out at a temperature of 120° to 150° C.

14. A process according to claim 1 wherein the silane is homogeneously distributed within the plasticized plastic film.

15. A process according to claim 14 wherein said film contains 0.1 to 5 percent by weight of said silane.

16. A process according to claim 15 wherein said film contains 0.5 to 3 weight percent silane.

17. A process according to claim 7 wherein said silane has the formula $$NH_2-(CH_2)_n-Si(OR)_3 \qquad III$$

wherein n=2 to 6 and R=a branched or unbranched C$_1$ to C$_8$ alkyl group which can be interrupted by oxygen atoms in the chain.

18. A process according to claim 5 wherein said silane is selected from the group consisting of γ-aminopropyltrialkoxysilane, γ-aminoethyltrialkoxysilane, β-aminoethyl-γ-oxypropylmethyldialkoxysilane and polyaminotrialkoxysilane.

19. A process according to claim 7 wherein said silane has the formula $$HN[CH_2-CH_2-CH_2-Si(OR)_3]_2 \qquad IV$$

wherein R is a branched or unbranched C$_1$–C$_8$ alkyl group which can be interrupted by oxygen atoms in the chain and the hydrogen atoms of the amino group can be replaced by an amino or polyamino alkyl moiety.

20. A process according to claim 1 wherein said silane is a silicon-functional silane and has the formula $$R_n-Si-R'_{4-n}$$

wherein each R radical represents the same or different saturated straight or branched alkyl moiety of 1 to 10 carbon atoms, R' represents a halogen or identical or different saturated alkoxy group of 1 to 8 carbon atoms which can be interrupted by a hetero atom and n is equal to 1 to 3.

21. A process according to claim 20 wherein said silane is selected from the group consisting of propyltriethoxysilane, propyltrimethoxysilane, isopropyldimethoxyethoxysilane, n-butyl triethoxysilane, isobutyltriethoxysilane, n-butyl trimethoxysilane and isobutyltrimethoxysilane.

22. A laminate comprising a pair of silicate glass sheets bonded to a plasticized plastic sheet of a vinyl chloride containing polymer, said plasticized sheet containing a functional silane therein.

23. A laminate according to claim 22 wherein said functional silane is disposed at the interface between the silicate glass and the plasticized polyvinyl chloride containing sheet.

24. A laminate according to claim 22 wherein said functional silane is disposed within said polyvinyl chloride containing sheet.

25. A laminate according to claim 1 wherein said functional silane is an silicon organo functional alkoxy silane containing an amino and/or imino and/or epoxy group, one or both of the hydrogen atoms of any amino group present being replaceable by an amino, hydroxy alkyl or polyamino moiety.

26. A laminate according to claim 25 wherein said organofunctional silane has the formula $$\left[(RO)_n-\underset{R_{3-n'''}}{\overset{|}{Si}}-A\right]_m NR_{3-m'} \qquad I$$

in which R is a C$_1$ to C$_{10}$ alkyl moiety which can be interrupted by oxygen atoms, R''' is an alkyl moiety of 1 to 8 carbon atoms, A is a straight-chain or branched alkylene moiety of 1 to 8 carbon atoms which can be interrupted by oxygen bridges, m=1 or 2 or 3, n=1 or 2 or 3, R', when m=1, represents H and/or R''—NH$_2$ or R''OH (R'' being an alkylene moiety of 2 to 4 carbon atoms), and, when m=2, R' represents H or $$R''-NH-A\underset{R'''_{3-n}}{\overset{|}{Si(OR)_n}}$$

27. A laminate according to claim 25 wherein said silicon organofunctional silane is one having the formula $$(RO)_n-\underset{R'''_{3-n}}{\overset{|}{Si}}-A-\underset{H_2C}{\overset{|}{N}}-\underset{\underset{CH_2}{\diagup}}{\overset{\diagdown}{\overset{\|}{C}}}-R' \qquad II$$

in which R, R''', A and n have the same meaning as in Formula I and R' is H or CH$_3$ or C$_2$H$_5$.

28. A laminate according to claim 25 wherein said silane has the formula $$NH_2-(CH_2)_n-Si(OR)_3 \qquad III$$

wherein n=2 to 6 and R=a branched or unbranched $C_1$ to $C_8$ alkyl group which can be interrupted by oxygen atoms in the chain.

29. A laminate according to claim 25 wherein said silane has the formula $$HN[CH_2-CH_2-CH_2-Si(OR)_3]_2 \qquad IV$$

wherein R is a branched or unbranched $C_1$-$C_8$ alkyl group which can be interrupted by oxygen atoms in the chain and the hydrogen atoms of the amino group can be replaced by an amino or polyamino alkyl moiety.

30. A laminate according to claim 22 wherein said silane is a silicon-functional silane and has the formula $$R_n-Si-R'_{4-n}$$

wherein each R radical represents the same or different saturated straight or branched alkyl moiety of 1 to 10 carbon atoms, R' represents a halogen or identical or different saturated alkoxy group of 1 to 8 carbon atoms which can be interrupted by a hetero atom and n equals 1 to 3.

31. A laminate according to claim 22 wherein said polyvinyl chloride sheet is a sheet of a polyvinyl chloride homopolymer, a sheet of a polyvinyl chloride copolymer or a sheet of a graft polymer containing polyvinyl chloride.

32. A laminate according to claim 31 wherein said silane is present in an amount of 0.01 to 5 weight percent and said silane is disposed at the interface of said plastic sheet and said silicate glass.

33. A laminate according to claim 31 wherein said silane is disposed within the plastic sheet and is present therein in an amount of 0.1 to 5 percent by weight.

34. A laminate according to claim 22, containing 17% to 45% by weight plasticizer.

35. A laminate according to claim 34, containing 20% to 37% by weight plasticizer.

* * * * *